US010540720B2

(12) United States Patent
Globe et al.

(10) Patent No.: US 10,540,720 B2
(45) Date of Patent: Jan. 21, 2020

(54) SYSTEMS AND METHODS FOR ADMINISTERING INVESTMENT PORTFOLIOS BASED ON TRANSACTION DATA

(71) Applicant: The Toronto-Dominion Bank, Toronto (CA)

(72) Inventors: Michael E. Globe, Toronto (CA); Mazin Al-Samadi, Burlington (CA); Lauren Van Heerden, Bedford, NH (US); Gunalan Nadarajah, Milton (CA); Orin Del Vecchio, Richmond Hill (CA); Michael D. Cummins, Pickering (CA); Prabaharan Sivashanmugam, Farmington Hills, MI (US)

(73) Assignee: The Toronto-Dominion Bank, Toronto (CA)

( * ) Notice: Subject to any disclaimer, the term of this patent is extended or adjusted under 35 U.S.C. 154(b) by 471 days.

(21) Appl. No.: 14/504,250

(22) Filed: Oct. 1, 2014

(65) Prior Publication Data

US 2015/0095263 A1    Apr. 2, 2015

Related U.S. Application Data

(63) Continuation of application No. 14/502,022, filed on Sep. 30, 2014, now abandoned.
(Continued)

(51) Int. Cl.
*G06Q 40/06* (2012.01)
*G06Q 30/02* (2012.01)

(52) U.S. Cl.
CPC ......... *G06Q 40/06* (2013.01); *G06Q 30/0255* (2013.01)

(58) Field of Classification Search
USPC ......... 705/35, 39, 41, 38, 45; 715/273, 512; 709/219, 223, 224; 379/111; 455/556.1,
(Continued)

(56) References Cited

U.S. PATENT DOCUMENTS 6,134,535 A * 10/2000 Belzberg ............... G06Q 40/06
                                                   705/36 R
6,154,732 A    11/2000 Tarbox
(Continued)

FOREIGN PATENT DOCUMENTS

CA         2430402 A1    11/2004
WO    WO 2004/008367 A1     1/2004
WO    WO 2012/162722 A1    12/2012

OTHER PUBLICATIONS

Hsin-Tsung Peng, William W. Y. Hsu, Chih-Hung Chen, Feipei Lai, FinancialCloud: Open Cloud Framework of Derivative Pricing, 2013 International Conference on Social Computing (pp. 782-789). (Year: 2013).*

(Continued)

*Primary Examiner* — Bennett M Sigmond
*Assistant Examiner* — Tien C Nguyen
(74) *Attorney, Agent, or Firm* — Duane Morris LLP

(57) ABSTRACT

The disclosed embodiments include systems and methods for administering actual and virtual investment portfolios based on transaction data associated with one or more users. The disclosed embodiments may be configured to modify an investment risk tolerance of a user based on transaction data identifying one or more first products purchased by the user and one or more prior financial services transactions associated with the user. The disclosed embodiments may also be configured to identify one or more first securities based on a portion of the transaction data and the modified investment
(Continued)

risk tolerance. In certain aspects, the identified first securities may be related to at least one of the purchased products.

20 Claims, 3 Drawing Sheets

Related U.S. Application Data

(60) Provisional application No. 61/884,745, filed on Sep. 30, 2013.

(58) Field of Classification Search
USPC ........ 455/456.1; 726/26; 713/189, 153, 156; 707/612, 625; 235/472.01
See application file for complete search history.

(56) References Cited

U.S. PATENT DOCUMENTS

| | | |
|---|---|---|
| 6,484,152 B1 | 11/2002 | Robinson |
| 7,171,384 B1 | 1/2007 | Fitzpatrick et al. |
| 7,315,837 B2 | 1/2008 | Sloan et al. |
| 7,401,731 B1 | 7/2008 | Pletz et al. |
| 7,533,258 B2* | 5/2009 | Baugher ............. H04L 63/0807 713/156 |
| 7,630,986 B1* | 12/2009 | Herz ...................... G06Q 10/10 |
| 7,720,732 B2* | 5/2010 | Lortscher, Jr. ......... G06Q 30/02 705/35 |
| 7,783,545 B2 | 8/2010 | Sloan et al. |
| 7,818,233 B1 | 10/2010 | Sloan et al. |
| 7,822,669 B2 | 10/2010 | Tyagi et al. |
| 7,831,494 B2 | 11/2010 | Sloan et al. |
| 7,860,774 B1 | 12/2010 | Peterson et al. |
| 7,997,969 B1 | 8/2011 | Murrell et al. |
| 8,065,712 B1* | 11/2011 | Cheng ................... H04L 63/105 726/1 |
| 8,271,310 B2 | 9/2012 | Flake et al. |
| 8,306,885 B2 | 11/2012 | Brose et al. |
| 8,306,900 B2* | 11/2012 | Bok ........................ G06Q 40/04 705/37 |
| 8,407,125 B2 | 3/2013 | Jenson et al. |
| 8,417,614 B1 | 4/2013 | Mackrell et al. |
| 8,452,653 B1 | 5/2013 | Gottfurcht et al. |
| 8,473,858 B2 | 6/2013 | Buchanan et al. |
| 8,498,913 B2 | 7/2013 | Jenson et al. |
| 8,527,382 B2 | 9/2013 | McDonough et al. |
| 8,566,184 B1 | 10/2013 | Paluck et al. |
| 8,620,788 B2 | 12/2013 | Biske |
| 8,645,254 B2 | 2/2014 | Castile et al. |
| 8,781,906 B2 | 7/2014 | Crittenden et al. |
| 9,710,784 B2* | 7/2017 | Amos ................. G06Q 30/0201 |
| 2001/0027430 A1 | 10/2001 | Sabourian |
| 2001/0051909 A1* | 12/2001 | Keith .................. G06Q 30/0601 705/37 |
| 2002/0032627 A1 | 3/2002 | Perot et al. |
| 2002/0046110 A1 | 4/2002 | Gallagher |
| 2002/0052818 A1 | 5/2002 | Loveland |
| 2002/0059126 A1 | 5/2002 | Ricciardi |
| 2002/0099610 A1 | 7/2002 | Marion |
| 2003/0036989 A1 | 2/2003 | Bhatia |
| 2003/0061094 A1 | 3/2003 | Banerjee et al. |
| 2003/0065608 A1* | 4/2003 | Cutler .................... G06Q 40/00 705/37 |
| 2003/0088532 A1 | 5/2003 | Hampshire |
| 2003/0093353 A1 | 5/2003 | Ward et al. |
| 2003/0195800 A1 | 8/2003 | Peters |
| 2003/0220834 A1 | 11/2003 | Leung et al. |
| 2004/0083150 A1 | 4/2004 | Michaud et al. |
| 2004/0093343 A1 | 5/2004 | Lucas et al. |
| 2004/0172354 A1 | 9/2004 | Charnley |
| 2004/0210505 A1 | 10/2004 | Pourhamid |
| 2005/0010472 A1 | 1/2005 | Quatse et al. |
| 2005/0027632 A1 | 2/2005 | Zeitoun et al. |
| 2005/0144066 A1 | 6/2005 | Cope et al. |
| 2005/0154662 A1 | 7/2005 | Langenwalter |
| 2005/0203823 A1 | 9/2005 | Cushing |
| 2005/0228874 A1* | 10/2005 | Edgett ..................... H04L 63/08 709/220 |
| 2006/0041472 A1 | 2/2006 | Lukose et al. |
| 2006/0282328 A1 | 12/2006 | Gerace et al. |
| 2007/0043653 A1 | 2/2007 | Hughes et al. |
| 2008/0033852 A1 | 2/2008 | Megdal et al. |
| 2008/0040250 A1 | 2/2008 | Salter |
| 2008/0046382 A1 | 2/2008 | Metz |
| 2008/0167991 A1 | 7/2008 | Carlson et al. |
| 2008/0243716 A1 | 10/2008 | Ouimert et al. |
| 2008/0294569 A1 | 11/2008 | Dever |
| 2009/0048927 A1 | 2/2009 | Gross |
| 2009/0055266 A1 | 2/2009 | Brody et al. |
| 2009/0125449 A1 | 5/2009 | Levering et al. |
| 2009/0171755 A1 | 7/2009 | Kane et al. |
| 2009/0216639 A1 | 8/2009 | Kapczynski et al. |
| 2010/0030702 A1 | 2/2010 | Kelly et al. |
| 2010/0100424 A1 | 4/2010 | Buchanan et al. |
| 2010/0119053 A1 | 5/2010 | Goeldi |
| 2010/0018001 A1 | 7/2010 | Hardt |
| 2010/0169204 A1 | 7/2010 | Sippy et al. |
| 2011/0040670 A1* | 2/2011 | Highland ............... G06Q 10/04 705/37 |
| 2011/0078073 A1 | 3/2011 | Annapindi |
| 2011/0153520 A1 | 6/2011 | Jeng et al. |
| 2011/0251978 A1 | 10/2011 | Davies et al. |
| 2011/0270780 A1 | 11/2011 | Davies et al. |
| 2012/0011044 A1 | 1/2012 | Vasinkevich |
| 2012/0239482 A1 | 9/2012 | McInnes et al. |
| 2013/0018819 A1 | 1/2013 | Willis |
| 2013/0146853 A1 | 6/2013 | Hart et al. |
| 2013/0238380 A1 | 9/2013 | Peterson |
| 2013/0246306 A1 | 9/2013 | Adams et al. |
| 2013/0325517 A1 | 12/2013 | Berg |
| 2013/0339146 A1 | 12/2013 | Goldberg et al. |
| 2014/0012780 A1 | 1/2014 | Sanders |
| 2014/0040086 A1 | 2/2014 | Abbatiello et al. |

OTHER PUBLICATIONS

Sen Qin, Xufeng Chen, Weigang Sun, Optimal Investment Portfolio Model with Degree Risk in Complex Stock Network, 2011 Fourth International Workshop on Chaos-Fractals Theories and Applications (pp. 161-165). (Year: 2011).*

E. Ohkawa, Yan Chen, S. Mabu, K. Shimada, Evaluation of varying portfolio construction of stocks using Genetic Network Programming with control nodes, 2008 SICE Annual Conference (pp. 1231-1236). (Year: 2008).*

O'Connor, "New App Lets You Boycott Koch Brothers, Monsanto and More by Scanning Your Shopping Cart," Forbes.com May 14, 2013 (7 pages).

Jon, "Using Everyday Purchases to Find Stock Investments," novelinvestor.com, Dec. 17, 2012 (9 pages).

Statman, "Behavioral Finance: Past Battles and Future Engagements," Association for Investment Management and Research, Nov./Dec. 1999, pp. 18-27.

Sycara, et al., "Intelligent Agents in Portfolio Management," Agent Technology, Oct. 22, 1996, pp. 1-11.

"E*Trade finds a new use for packaging," Oct. 9, 2012 (2 pages).

Open Folio FAQ, http://www.openfolio.com/faq (2 pages).

* cited by examiner

US 10,540,720 B2

SYSTEMS AND METHODS FOR ADMINISTERING INVESTMENT PORTFOLIOS BASED ON TRANSACTION DATA

BACKGROUND

This application is a continuation of and claims the benefit of priority to U.S. patent application Ser. No. 14/502,022, filed Sep. 30, 2014, which claims the benefit of priority to U.S. Provisional Patent Application No. 61/884,745, filed Sep. 30, 2013. The entire disclosures of the above-identified applications are expressly incorporated herein by reference to their entireties.

TECHNICAL FIELD

The disclosed embodiments generally relate to computerized systems and methods for administering investment portfolios in a network environment, such as the Internet. More particularly, and without limitation, the disclosed embodiments relate to computerized systems and methods that create or modify actual and virtual investment portfolios based on transaction data.

BACKGROUND

New investors are often discouraged by the limited level of interaction and engagement available through websites and other investment tools provided by the financial institutions. While the discouragement may result from a general lack of interest in investing, real or perceived barriers can prevent these new investors from fully understanding the composition of their investment portfolio and the various investment opportunities provided by their financial institutions.

In many instances, the barriers result from a new investor's inability to connect a daily decision, such as a purchase of cereal or bathroom tissue at the grocery store, with a performance of a security held within his or her investment portfolio. For example, an investor may regularly purchase Ben & Jerry's™ ice cream, but may be unaware that his or her investment portfolio includes stock of Unilever™, which owns Ben & Jerry's™. The complex nature of financial instruments commonly held in investment portfolios (e.g., mutual funds and exchange-traded funds (ETFs)) further complicates the linkage between the investor's everyday purchases and a performance of his or her investment portfolio. Moreover, even assuming the investor could appreciate the impact of an everyday purchase on an investment portfolio, the investor would be challenged to monitor this impact over time due to the constantly changing composition of the investment portfolio and to changes in the corporate structure of manufacturers of consumer products.

SUMMARY

The disclosed embodiments include computerized methods and systems for identifying one or more products purchased by a user, and for creating or modifying actual and virtual investment portfolios for the user based on purchased products.

The disclosed embodiments include, for example, a computer-implemented method that may obtain an investment risk tolerance of a user. The method may also obtain transaction data associated with the user. In one aspect, the transaction data identifies (i) one or more products purchased by the user and (ii) one or more prior financial services transactions associated with the user. The method includes determining a modified investment risk tolerance of the user based on the obtained investment risk tolerance and at least a portion of the transaction data.

The disclosed embodiments also include a system having a storage device and at least one processor coupled to the storage device. The storage device may store software instructions for controlling the at least one processor when executed by the at least one processor. In one embodiment, the at least one processor may be operative with the software instructions and may be configured to obtain an investment risk tolerance of a user. The at least one processor may be further configured to obtain transaction data associated with the user. In one aspect, the transaction data identifies (i) one or more products purchased by the user and (ii) one or more prior financial services transactions associated with the user. The at least one processor may be further configured to determine a modified investment risk tolerance of the user based on the obtained investment risk tolerance and at least a portion of the transaction data.

The disclosed embodiments further include a computer-implemented method that obtains transaction data associated with a user. In one aspect, the transaction data identifying (i) one or more products purchased by the user and (ii) one or more prior financial services transactions associated with the user. The method includes modifying an investment risk tolerance of the user based on at least a portion of the transaction data, and identifying one or more first securities based on the transaction data and the modified investment risk tolerance. In certain aspects, the first securities are related to at least one of the products. The method may generate one or more first electronic instructions to transmit information identifying a set of the one or more first securities to a device of the user.

The disclosed embodiments also include a system having a storage device and at least one processor coupled to the storage device. The storage device may store software instructions for controlling the at least one processor when executed by the at least one processor. In one embodiment, the at least one processor may be operative with the software instructions and may be configured to obtain transaction data associated with a user. In one aspect, the transaction data identifying (i) one or more products purchased by the user and (ii) one or more prior financial services transactions associated with the user. The at least one processor may be further configured to modify an investment risk tolerance of the user based on at least a portion of the transaction data, and identify one or more first securities based on the transaction data and the modified investment risk tolerance. In certain aspects, the first securities are related to at least one of the products. The at least one processor may be further configured to generate one or more first electronic instructions to transmit information identifying a set of the one or more first securities to a device of the user.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims.

DESCRIPTION OF THE EMBODIMENTS

Figure 1:
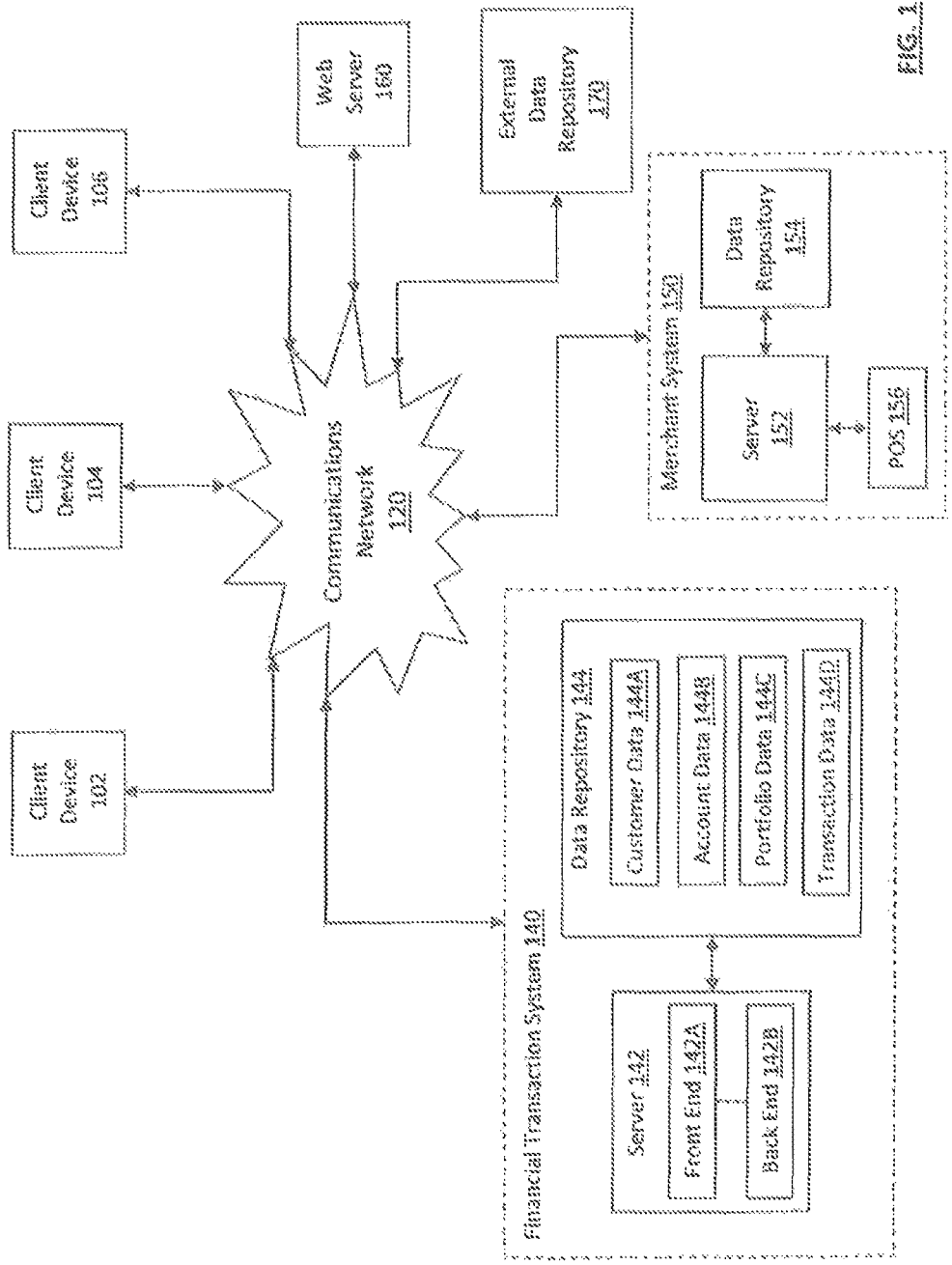
FIG. 1 is a diagram of an exemplary computing environment, consistent with disclosed embodiments.

Reference will now be made in detail to disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, any section headings used herein are for organizational purposes only, and are not to be construed as limiting the subject matter described.

FIG. 1 illustrates an exemplary computing environment 100, consistent with certain disclosed embodiments. In one aspect, system 100 may include a financial transaction system 140, a merchant system 150, a server 160, a data repository 170, and one or more client devices 102, 104, and 106 that may be interconnected via a communications network 120.

In one embodiment, financial transaction system 140 may be one or more computer systems associated with a financial institution, such as, for example, a commercial bank, an investment bank, a broker-dealer, a provider of a payment instrument and financial service accounts, etc. In some embodiments, a financial service account may be a check, savings, credit, debit, and/or a reward or loyalty account. In one embodiment, a payment instrument may include, but is not limited to, a personal or corporate credit card, a debit card, a prepaid credit or debit card, and a check instrument. These transactions include, but are not limited to, a transfer of funds between financial accounts (e.g., checking, savings, investment, etc.), a payment of a bill, a purchase or sale of a financial instrument or security, a deposit or withdrawal of funds, or an application for credit.

In certain embodiments, financial transaction system 140 may include a server 142 and a data repository 144. Server 142 may be, for example, a transaction server and may include a front end 142A, and a back end 142B disposed in communication with front end 142A, although the configuration of server 142 is not limited to such configurations. For exemplary purposes only, server 142 may be referred to as a transaction server 142. In one example, front end 142A and back end 142B of transaction server 142 may be incorporated into a single computer, a single server, or any additional or alternate computing device apparent to one or skill in the art. In other embodiments, front end 142A and backend 142B may be distributed computing devices. Further, in one embodiment, front end 142A may be one or more software programs, such as a software application (e.g., a web service) executing on transaction server 142. Similarly, backend 142B may be one or more software programs executing on server 142. However, transaction server 142 is not limited to such configurations, and, in additional embodiments, front end 142A can be executed on any computer or server separate from back end 142B.

Transaction server 142 may be configured to execute software instructions to perform one or more processes consistent with the disclosed embodiments. In one embodiment, and client devices 102, 104, and 106 may exchange information and parameters that facilitate an execution of one or more transactions by financial transaction system 140.

Data repository 144 may be one or more data storages configured to store information consistent with the disclosed embodiments. In one aspect, data repository may include customer data 144A, account data 144B, portfolio data 144C, and transaction data 144D. In one aspect, customer data 144A may include one or more data records that uniquely identify one or more users of a financial institution associated with transaction system 140. By way of example, a user of the financial institution may access a web page associated with transaction system 140 (e.g., through a web server executed by front end 142A), and may register for online banking services and provide data which may be linked to the user and stored within customer data 144A.

In certain aspects, customer data 144A may include personal information associated with a user (e.g., a user name, a home address, and a date of birth), government-issued identifiers (e.g., driver's license numbers and Social Security numbers), employment information (e.g., employer name and address), and contact information (e.g., email addresses, home numbers, work numbers, and mobile numbers). Customer data 144A may also include one or authentication credentials associated with registered users of the financial institution. For example, the authentication credentials may include, but are not limited to, a user name, a user-specified password, a system-generated password, or an alphanumeric identification number (e.g., a PIN number) specified by the user or assigned by financial transaction system 140. Other types of user information may be stored and used by the disclosed embodiments.

Additionally or alternatively, customer data 144A may include information facilitating enhanced authentication techniques. For example, customer data 144A may store information identifying a security question associated with the user (e.g., "What is your mother's maiden name?") and the user's registered answer to that security question. Customer data 144A may also include information identifying a particular security image or avatar selected by the user and displayed by the user during the authentication process.

Further, in one embodiment, customer data 144A may include user device identification information that identifies one or more devices registered to the user. In one embodiment, the user may provide the user device identification information (e.g., a mobile telephone number provided by the user when registering for online banking services), or alternatively, transaction server 142 may be configured to execute processes that automatically collect user device identification information (e.g., collecting an Internet Protocol (IP) address associated with the user's smartphone).

Customer data 144A may also include data that enables transaction server 142 to target content to one or more user s (e.g., users of financial institution associated with financial transaction system 140), or alternatively, to identify a peer group of user s (e.g., users) having interests similar to those of a particular user (e.g., customer). For example, such data may include, but is not limited to, demographic data associated with the group of user s (e.g., age group, educational level, income level), social networking data (e.g., "handles" and links to one or more social networking sites), profile data indicating specific interests, and any additional or alternate data that appropriate to the users and transaction server 142.

In certain aspects, account data 144B may include account identification information identifying one or more accounts of users of the financial institution associated with transaction system 140. In one embodiment, account identification information may include financial service account information, such as, for example, a checking account, a savings account, a revolving credit line, an account linked to a credit or debit card, a brokerage account, and any additional or alternate account provided or supported by the financial institution. In other embodiments, account data 144B may include account information associated with non-financial service accounts, such as membership accounts for certain services or activities (e.g., gym membership, prescription drug information, library card, employment identification, student account information, etc.)

In such embodiments, information within account data 144B may identify, for a single customer, one or more accounts associated with the user and account data corresponding to the accounts (e.g., an account number, expiration date information, card security codes, account balance information, and/or credit limit information).

Portfolio data 144C may include information identifying investment portfolios held by users of the financial institution. In one aspect, portfolio data 144C may include information identifying a real or "actual" investment portfolio composed of actual financial positions held by a user in various securities. In further aspects, portfolio data 144C may include information identifying one or more "virtual" investment portfolios composed of "simulated" positions held by the user in various securities. Portfolio data 144C may also include information identifying one or more "watch lists" that specify various securities monitored by the user.

In certain embodiments, the securities associated with the user's actual investment portfolio, virtual investment portfolio, and watch list may represent various equity and debt securities, including, but not limited to, shares of common stock, corporate or governmental bonds, mutual funds, bond funds, etc. Further, portfolio data 144C may include information identifying the simulated or actual positions held by the user in these securities, as well as information identifying a schedule for providing electronic updates to the user regarding a performance of these securities (e.g., daily, weekly, monthly, quarterly, or in response to customer-specific events).

Portfolio data 144C may also include information identifying an investment risk tolerance of the user. In one embodiment, the user's investment risk tolerance may represent a score ranging from one, which indicates a completely risk-averse user, to ten, which indicates a user willing to accept significant speculative risk within a corresponding actual or virtual investment portfolio. By way of the example, the investment risk tolerance score may be specified by the user, e.g., at an initial registration to access investment products associated with the financial institution, or alternatively, may be determined by transaction server 142 from an outcome of an interactive financial investment game, as outlined below, Further, portfolio data 144C may include information identifying one or more investment goals of the user. Investment goals consistent with the disclosed embodiments include, but are not limited to, a specified cash reserve associated with an actual or virtual investment portfolio, a maximum value of all securities and cash within an actual or virtual investment portfolio, and a ratio of debt instruments (e.g., bonds) to equity instruments (e.g., common stock) within an actual or virtual investment portfolio.

In certain embodiments, financial transaction system 140 may be configured to execute software processes that provide an online banking portal enabling the user to generate and administer a virtual investment portfolio or watch list that includes one or more securities of interest (e.g., identified based on the user's prior transactions, specified interests, or securities held by a corresponding "investment" group). Financial transaction system 140 may, in such embodiments, be configured to store information identifying the generated virtual investment portfolio and/or watch list within portfolio data 144C. In certain aspects, the information obtained through the user's interaction with the virtual portfolio or the watch list may provide the user with sufficient confidence generate and administer an actual investment portfolio composed of actual positions in the securities of interest.

In further embodiments, the online banking portal allows the user to "rebalance" a virtual or actual investment portfolio by increasing or decreasing a position in one or more securities (e.g., an equity position in an equity security and a creditor position in a debt security). For instance, the rebalancing of the virtual or actual investment portfolio may occur at periodic intervals, in response to certain events within the marketplace (e.g., in response to market fluctuations of predetermined magnitude), or alternatively, in response to one or more transactions to purchase goods or services. Further, in some embodiments, a financial advisor or third party associated with the financial institution may advise the user regarding the rebalancing of the actual or virtual portfolio.

Transaction data 144D may include information identifying one or more transactions that involve one or more users of the financial institution associated with financial transaction system 140, and additionally or alternatively, one or more accounts of the one or more users of the financial institution. In one embodiment, such transactions may include, but are not limited to, purchase transactions (e.g., purchases of goods and/or services from electronic or physical retailers), financial service transactions (e.g., fund transfers between accounts), bill payment transactions (e.g., electronic bill payment transactions), financial instrument or security purchases or sales, a deposit or withdrawal of funds, or an application for credit from the financial institution or other entity.

For example, as described herein, financial transaction system 140 may execute software processes that provide an online financial service portal enabling a user to access a web page of the financial institution to perform financial service type transactions. For instance, financial transaction system 140 may provide an online banking portal that enables a user to transfer funds between a first account to a second account, to schedule automatic bill payment services (e.g., select an amount and periodic payment date for making payments to an identified payee from the user's selected financial account), and other known types of online financial service processes. For instance, financial transaction server 142 may generate a data record within transaction data 144D that corresponds to the particular service initiated by the customer, such as an initiated transfer of funds, and may populate the data record with information associated with the initiated transaction. As an example, transaction information for a funds transfer may include, but is not limited to, a unique identifier associated with the fund transfer transaction, a timestamp of the transaction, and transaction parameter information (e.g., a source account, a target account, a transaction date, and an amount of transfer).

In some embodiments, transaction data 144D may include information identifying a purchased good or service, which may include one or more product identifiers (e.g., a name of the good or service, a stock-keeping unit (SKU) number, a universal product code (UPC), a quick response (QR) code, and/or a photographic or visual representations of the good or service). Additionally or alternatively, the information identifying the purchased good or service data may include: a brand name associated with the good or service; one or more categories associated with the good or service; a product line or product family associated with the good or service; information identifying related or competitor goods and services; physical characteristics of the purchased goods (e.g., a functionality, a size, a shape, a weight, and a color); and information associated with the retailer (e.g., a name of the retailer or a geographic location of the retailer). Further, as described below, the various elements of obtained data may be linked through a hierarchical relationship.

Merchant system 150 may be one or more computer systems associated with a business entity that provides products and/or services. In one example, merchant system 150 may be associated with a retailer having one or more physical retail locations disposed within a geographic area (i.e., a "physical retailer"). Merchant system 150 may be a retailer that provides electronic or e-commerce type retail services. In one example, merchant system 150 may be an electronic or an e-commerce retailer that interacts with consumers through corresponding web interfaces or retailer-specific application programs (e.g., mobile "apps"). In one embodiment, one or more client devices 102, 104, and 106 can exchange information with merchant system 150 to purchase one or more goods and/or services using various payment instruments, and merchant system 150 exchanges information with financial transaction system 140 to obtain authorization for such purchase instruments, e.g., using a point-of-sale module described below.

Merchant system 150 may include, in one example, a merchant server 152, a data repository 154, and point-of-sale (POS) module 156. Although not depicted in FIG. 1, merchant server 152 may include a front end and a back end disposed in communication with the front end. In an embodiment, the front and back ends may be incorporated into a hardware unit, for example, a single computer, a single server, or any additional or alternate computing device apparent to one or skill in the art. In other embodiments, the front end may be a software application, such as a web service, executing on merchant server 152. However, merchant server 152 is not limited to such configurations, and, in additional embodiments, the front end may be executed on any computer or server separate from the back end.

Data repository 154 may be one or more storage devices that store information consistent with the disclosed embodiments. In one aspect, data repository 154 may store user data that uniquely identifies and profiles one or more users of the merchant associated with merchant system 150, and transaction data identifying one or more purchase transactions involving one or more users of the merchant. Further, in such embodiments, data repository 164 also includes elements of electronic content that may be delivered to users of the merchant, including but not limited to, images and corresponding text describing goods and services sold by the merchant, one or more advertisements that could be delivered to the users, and one or more rewards that could be provided to the customer.

In one embodiment, POS 156 may be one or more point-of-sale devices configured to perform known point-of-sale processes. A POS 156 may be disposed at a physical location in a merchant location associated with merchant system 150, such as a location where a user may provide payment for goods and/or services (e.g., at a cash register at the merchant). The disclosed embodiments are not limited to such physical POS modules, and in additional embodiments, POS module 156 may be a software module executed by merchant server 152.

Client devices 102, 104, and 106 may each reflect a computing device associated with a user (e.g., a user of the merchant and/or the financial institution disclosed above). In certain aspects, client devices 102, 104, and 106 can include, but are not limited to, a personal computer, a laptop computer, a tablet computer, a notebook computer, a hand-held computer, a personal digital assistant, a portable navigation device, a mobile phone, a smart phone, a set top box, a third party portals, an optical disk player (e.g., a DVD player), a digital video recorder (DVR), and any additional or alternate computing device operable to transmit and receive data across network 120.

Further, although computing environment 100 is illustrated in FIG. 1 with three client devices 102, 104, and 106 in communication with transaction system 140, persons of ordinary skill in the art will recognize that environment 100 may include any number of number of mobile or stationary client devices, and any additional number of computers, systems, or servers without departing from the spirit or scope of the disclosed embodiments. Further, although computing environment 100 is illustrated in FIG. 1 with a single merchant system 150, a single transaction system 140, a single server 160, and a single external data repository 170, persons of ordinary skill in the art will recognize that environment 100 may include any number of additional number of merchant and financial systems, any number of additional number of servers and data repositories, and any additional number of computers, systems, servers, or server farms without departing from the spirit or scope of the disclosed embodiments.

Communications network 120 may represent any form or medium of digital data communication. Examples of communication network 120 include a local area network ("LAN"), a wireless LAN, a RF network, a Near Field Communication network, e.g., a "WiFi" network, a wireless Metropolitan Area Network (MAN) that connects multiple wireless LANs, and a wide area network ("WAN"), e.g., the Internet. Consistent with embodiments of the present disclosure, network 120 can include the Internet and include any publicly accessible network or networks interconnected via one or more communication protocols, including, but not limited to, hypertext transfer protocol (HTTP) and transmission control protocol/internet protocol (TCP/IP). Moreover, communications network 120 may also include one or more mobile device networks, such as a GSM network or a PCS network, that allow client devices, such as client device 102, to send and receive data via applicable communications protocols, including those described above.

In one embodiment, one or more of transaction server 142 and merchant server 152 may include a general purpose computer (e.g., a personal computer, network computer, server, or mainframe computer) having one or more processors that may be selectively activated or reconfigured by a computer program. In additional embodiments, one or more of transaction server 142 and merchant server 152 may be incorporated as corresponding nodes in a distributed network, and additionally or alternatively, as corresponding networked servers in a cloud-computing environment. Furthermore, transaction server 142 and merchant server 152 may communicate via network 120 with one or more additional servers (not shown), which facilitate the distribution of processes for parallel execution by the additional servers. In certain aspects, transaction server 142 and/or merchant server 152 may execute software instructions that perform one or more processes consistent with the disclosed embodiments.

Server 160 may be a computing device that provides information to one or more other components of computing environment 100. In one embodiment, server 160 may include a general purpose computer (e.g., a personal computer, network computer, server, or mainframe computer) having one or more processors that may be selectively activated or reconfigured by a computer program. In one aspect, server 160 may be configured to provide one or more websites associated with an advertiser and/or content provider network. Further, upon request from a client device (e.g., client device 102), server 160 may be configured to provide information associated with a requested web page over communications network 120 to client device 102, which may render the received information and present the web page to a customer. Additionally, server 160 may be incorporated as a corresponding node in a distributed network, and additionally or alternatively, as a corresponding networked server in a cloud-computing environment. Furthermore, server 160 may communicate via network 120 with one or more additional servers (not shown), which may facilitate the distribution of processes for parallel execution by the additional servers.

Data repository 170 may be one or more storages that store information provided by or used by one or more components of computing environment 100. In one aspect, data repository may be incorporated into a single hardware unit, for example, a single computer or a single server. In such an embodiment, data repository 170 may include one or more storage mediums or storage devices. However, data repository 170 is not limited to such configurations, and, in additional embodiments, data repository 170 may reside on any additional or alternate computer or server accessible to transaction server 142, merchant server 152, and client devices 102, 104, and 106 over network 120.

Figure 2:
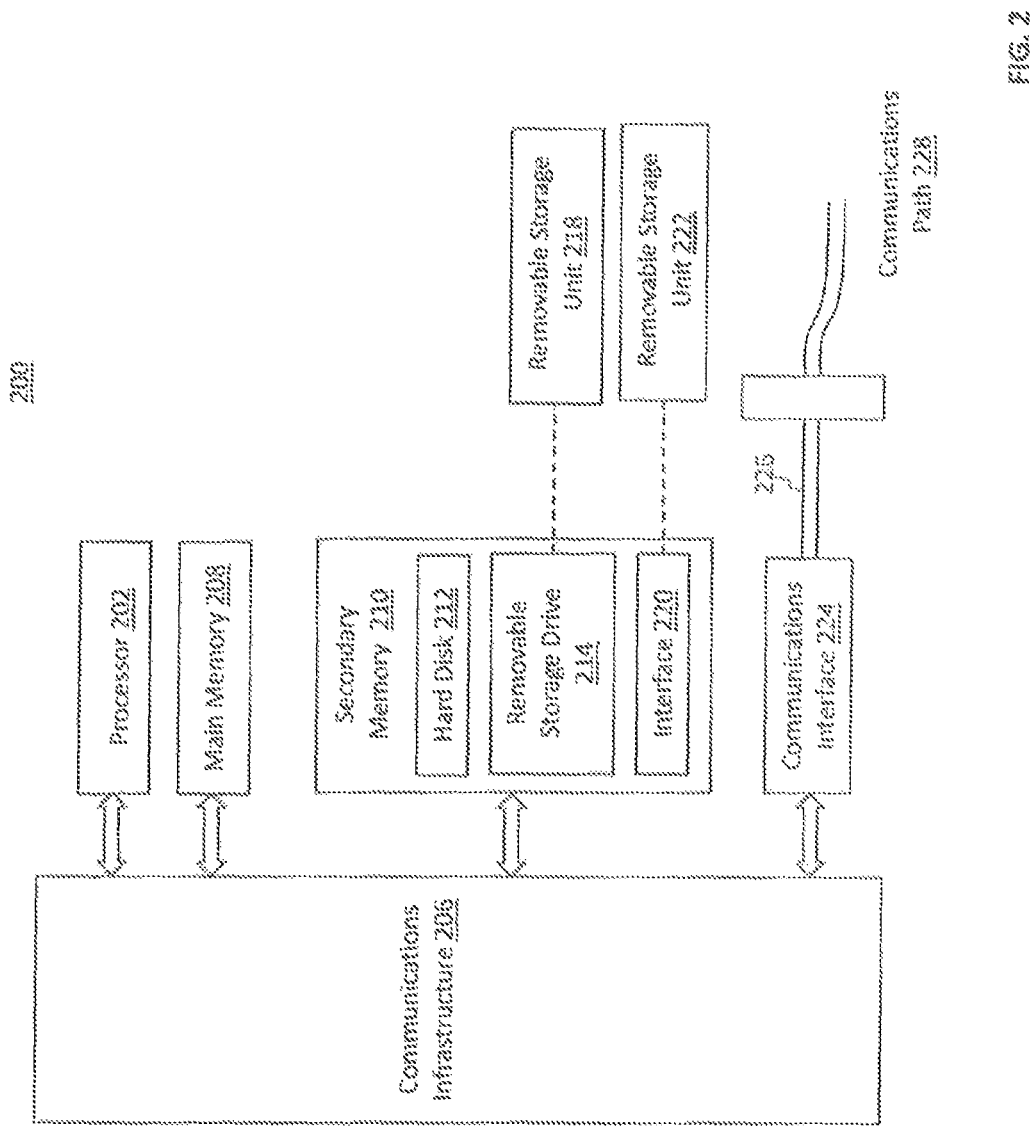
FIG. 2 is a diagram of an exemplary computer system, consistent with disclosed embodiments.

FIG. 2 is an exemplary computer system 200 with which embodiments consistent with the present disclosure may be implemented. In one aspect, computer system 200 may reflect the computer systems associated with server 142, server 152, server 160, client devices 102, 104, and/or 106. In certain embodiments, computer system 200 may include one or more processors, such as processor 202. Processor 202 may be connected to a communication infrastructure 206, such as a bus or communications network, e.g., network 120 of FIG. 1.

Computer system 200 may also include a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 may represent a magnetic tape, optical disk, or other storage medium that is read by and written to by removable storage drive 214. As will be appreciated, the removable storage unit 218 can represent a computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interlace 224. Communications interface 224 allows software and data to be transferred between computer system 200 and external devices. Examples of communications interface 224 may include a modem, a network interface (e.g., an Ethernet card), a communications port, a PCMCIA slot and card, etc. Software and data may be transferred via communications interface 224 in the form of signals 226, which may be electronic, electromagnetic, optical or other signals capable of being received by communications interface 224. These signals 226 are provided to communications interface 224 via a communications path (i.e., channel 228). Channel 228 carries signals 226 and may be implemented using wire, cable, fiber optics, RF link, and/or other communications channels. In a disclosed embodiment, signals 226 comprise data packets sent to processor 202. Information representing processed packets can also be sent in the form of signals 226 from processor 202 through communications path 228.

In certain embodiments in connection with FIG. 2, the terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer system 200. Such computer programs and sets of instructions can be stored within one or more computer-readable media. Additionally or alternatively, computer programs and sets of instructions may also be received via communications interface 224 and stored on the one or more computer-readable media.

Such computer programs and instructions, when executed by processor 202, enable processor 202 to perform one or more processes consistent with the disclosed embodiments. Examples of program instructions include, for example, machine code, such as code produced by a compiler, and files containing a high-level code that can be executed by processor 202 using an interpreter.

Furthermore, the computer-implemented methods described herein can be implemented on a single processor of a computer system, such as processor 202 of system 200. However, in additional embodiments, these computer-implemented methods may be implemented using one or more processors within a single computer system, and additionally or alternatively, these computer-implemented methods may be implemented on one or more processors within separate computer systems linked via a network.

The disclosed embodiments include systems and methods that enable a user to identify securities related to purchases of goods and services and to generate and administer "virtual" and "actual" investment portfolios based on these identified securities. For example, as described below in reference to FIG. 3, a user at a client device (e.g., one of client devices 102, 104, and 106 of FIG. 1) may access an online portal associated with a system of a financial institution (e.g., financial transaction system 140 of FIG. 1). Using the online portal, the user may receive information identifying one or more securities (e.g., "suggested" securities) that are related to the user's recent purchases of goods and services. In some embodiments, the user may further interact with the online portal to generate or modify a "virtual" investment portfolio, and additionally or alternatively, a "watch list," composed of simulated positions in one or more of the suggested securities (e.g., equity positions in equity securities and creditor positions in debt securities).

By interacting with the virtual investment portfolio or the watch list, the user may explore various investment opportunities offered by the financial institution, and further, may explore the impact of various financial conditions and financial services transactions on the simulated positions held within the virtual investment portfolio and/or watch list. In some embodiments, the user's interaction with the virtual investment portfolio and/or the watch list may enable to user with a tangible connections between the user's everyday purchases of goods and services and the composition of the users investment portfolio. Moreover, the user's interaction with the virtual investment portfolio and/or the watch list may also provide the user with sufficient confidence generate and administer a real or "actual" investment portfolio at the financial institution.

In certain aspects, the disclosed embodiments include methods and systems for providing information that identify to a user relationships between products they purchase and their investment portfolio, and, for example, enabling the administration of such investments. Certain aspects of the disclosed embodiments include automated mechanisms that provide, analyze, and modify investment portfolio information that cannot be readily done by a user because, for example, of the continual and complex changes to such portfolios, such as mutual funds, corporate structures, and product associations to corporate entities.

Figure 3:
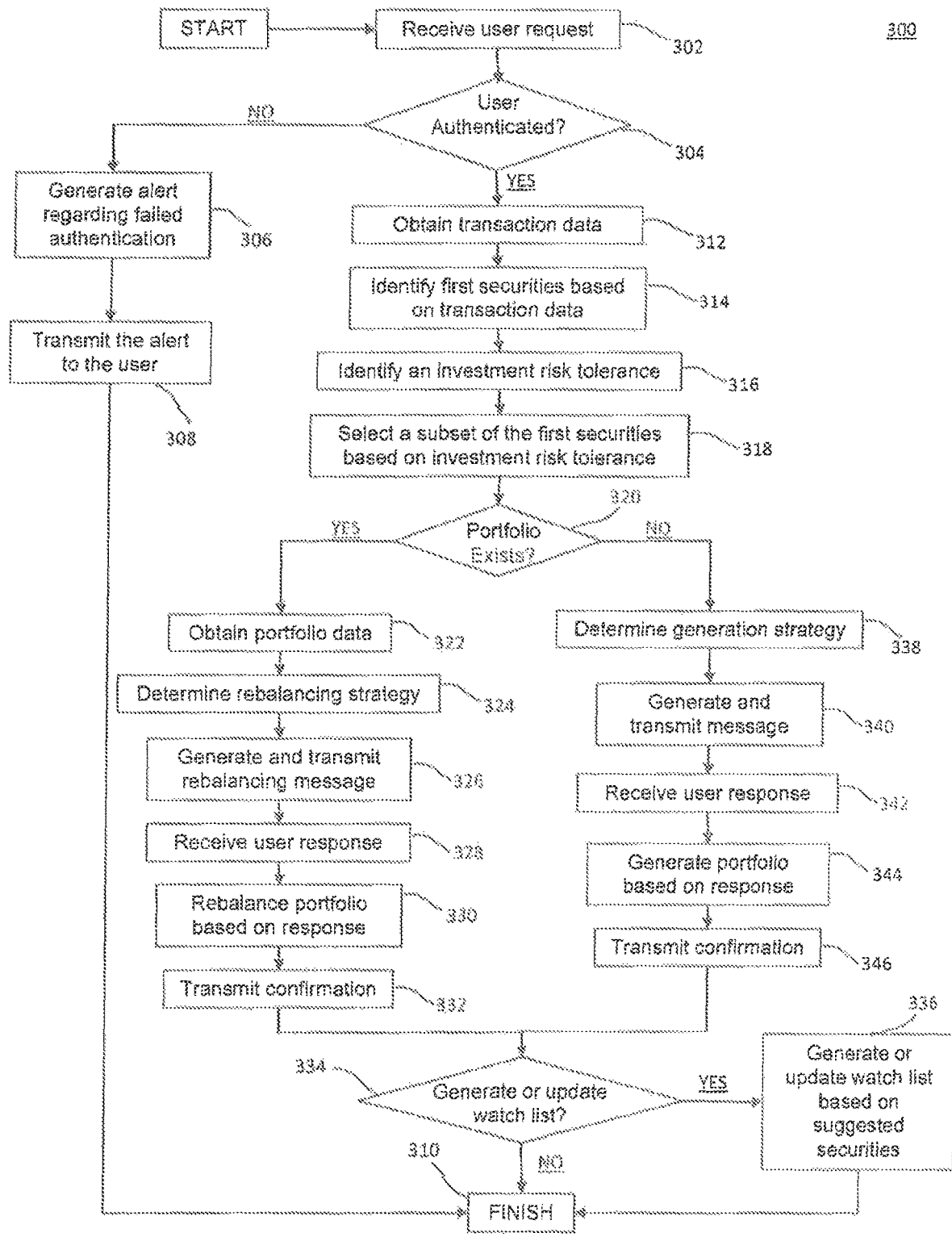
FIG. 3 is a flowchart of an exemplary method for administering actual and virtual investment portfolios, consistent with disclosed embodiments.

FIG. 3 illustrates an exemplary method 300 for administering actual investment portfolios, virtual investment portfolios, and/or watch lists based on transaction data, in accordance with disclosed embodiments. In one embodiment, a server (or other computing device or system) associated with a financial institution (e.g., transaction server 142 of FIG. 1) may be configured to obtain transaction data associated with a user. Transaction server 142 may be further configured to suggest one or more securities (e.g., common stocks, bonds, and/or derivatives contracts) related to a previously purchased product (e.g., a good or service). In certain aspects, transaction server 142 may incorporate at least a subset of the suggested securities into an investment portfolio held by the user (e.g., an "actual" or "real" investment portfolio), or alternatively, into a "virtual" investment portfolio or corresponding "watch list" that facilitates the user's exploration of various investment services of the financial institution.

In FIG. 3, in step 302, transaction server 142 may receive a request from a user to access information identifying one or more investment services offered by a financial institution. As described above, the user at a client device (e.g., client device 102 of FIG. 1) may access a web page associated with the financial institution, and may enter one or more authentication credentials (e.g., a user name, a password, an account number, and a personal identification number) into the accessed web page. Client device 102 may generate a request that includes the entered authentication credentials, which client device 102 may transmit to transaction server 142 using one or more of the communications protocols outlined above.

Upon receipt of the request in step 302, transaction server 142 may authenticate the user in step 304. For example, transaction server 142 may obtain the authentication credentials from the request, access data associated with the user (e.g., within customer data 144A of FIG. 1), and authenticate the user based on a comparison of the transmitted credentials and the obtained user data. Additionally or alternatively, transaction server may identify a source of the received request (e.g., a mobile telephone number or Internet Protocol (IP) address associated with client device 102), and may determine whether the identified source corresponds to a registered device of the customer. The disclosed embodiments are, however, not limited to such exemplary authentication techniques, and in additional embodiments, transaction server 142 may authenticate the user through any additional or alternate technique appropriate to the customer, client device 102, and the financial institution.

If transaction server 142 fans to authenticate the user (step 304; Yes), transaction server 142 generates an alert notifying the user of the failed authentication in step 306. In step 308, transaction server 142 may execute software processes to transmit the alert to client device 102 over network 120 using one or more of the communications protocols outlined above. Method 300 is then complete in step 310.

If, however, transaction server 142 authenticates the user (step 304; Yes), transaction server 142 may obtain transaction data associated with the user in step 312. For example, as described herein, the transaction data obtained in step 312 may identify one or more transactions between the user and corresponding physical or electronic retailers (e.g., merchant system 150 of FIG. 1). In some embodiments, transaction server 142 may obtain the transaction data from a data repository (e.g., transaction data 144D of data repository 144 and/or external data repository 170 of FIG. 1).

In certain embodiments, the obtained transaction data includes information identifying one or more products purchased by the user (e.g., purchased goods or services). For example, the information may include, but is not limited to, one or more product identifiers (e.g., a name of the product, a stock-keeping unit (SKU) number, a universal product code (UPC), a quick response (QR) code, and a photographic or visual representations of the product), a brand name associated with the product, one or more product categories, a product line or product family, information identifying related or competitor product, physical characteristics of the purchased product (e.g., a functionality, a size, a shape, a weight, and a color), and information associated with the retailer (e.g., a name of the retailer or a geographic location of the retailer).

Further, the disclosed embodiments may determine a hierarchical relationship that may exist between elements of the information identifying the purchased product within the transaction data obtained in step 312. For example, the user may have purchased a pint of Ben & Jerry's™ premium ice cream for $4.99 from a Safeway™ grocery store in Washington, D.C., on Aug. 19, 2013. In such an instance, the disclosed embodiments may obtain transaction data that includes a SKU number associated with the Ben & Jerry's™ premium ice cream. In certain aspects, the obtained transaction data may also include information identifying a corporate parent of Ben & Jerry's™ (i.e., Unilever™), the retailer (i.e., Safeway™), a location of purchase (i.e., Washington, D.C.), a date of purchase (i.e., Aug. 19, 2013), and/or an amount associated with the transaction (e.g., $4.99). Further, the SKU number may be linked to not only a brand identifier (i.e., Ben & Jerry's™) and a retailer (i.e., Safeway™), but also to a product type (e.g., ice cream), a product class (e.g., premium frozen desserts), and a product sector (e.g., dairy products).

Referring back to FIG. 3, in step 314, transaction server 142 may identify one or more securities of potential interest to the user based on the obtained transaction data. For example, in step 314, transaction server 142 may access information identifying a plurality of securities available to the user (e.g., stored within portfolio data 144C of FIG. 1), and may identify one or more entities that issue the available securities. In certain aspects, transaction server 142 may perform processes that automatically identify securities relating to business entities that provide one or more products purchased by the user. In other aspects, transaction server 142 may automatically identify one or more business entities that provide competing products to the one or more products purchased by the user. Transaction server 142 may execute software instructions that determine the relationship between competing products and/or business entities based on the product type information (e.g., ice cream), product sector (e.g., dairy products), or other parameters. For example, transaction server 142 may access and analyze information stored in one or more data storages that enables it to identify available securities that include common stock and corporate bonds issued by Unilever™, which provides different types of products, such as Ben & Jerry's™ (ice cream), Good Humor™ (ice cream), Dove™ (personal products), and Axe™ (personal products). Transaction server 142 may also identify available securities that include common stock issued by competing companies to Unilever™, such as General Mills™ which provides competing products, such as Häagen-Dazs™ (ice cream), and Procter & Gamble™, which provides competing products, such as Olay™ (personal products), and Gillette™ (personal products).

Transaction server 142 may be configured to identify whether one or more of the common stock issued by, for example, Unilever™, the common stock issued by General Mills™, the common stock issued by Procter & Gamble™, and the bonds issued by Unilever™ are related to a product purchased by the customer. For example, as described herein, the user may have purchased Ben & Jerry's™ premium ice cream, and based on that information, transaction server 142 may determine in step 314 that a relationship exists between Unilever™, which issued available common stocks and bonds, and the recently purchased Ben & Jerry's premium ice cream. In certain embodiments, transaction server 142 may execute software instructions that determine a potential interest between the user and securities of identified business entities based on the relationship between the identified products purchased by the user. For example, transactions server 142 may execute software instructions that determines that the existence of the relationship between Unilever™, which issues available common stocks and bonds, and the user's recently purchased Ben & Jerry's™ premium ice cream indicates that the Unilever™ common stock and bonds may be of potential interest to the user.

The disclosed embodiments are, however, not limited to techniques in which transaction server 142 identifies securities based on a relationship between a manufacturer or provider of a purchased product and an issuer of the security. For example, in additional embodiments, transaction server 142 may identify a first security based on any additional or alternate information associated with the purchased good or service. For example, transaction server 142 may determine in step 314 that that General Mills™ manufactures Häagen-Dazs™ ice cream, and as such, that common stock issued by Unilever™ and General Mills™ could be of potential interest to the customer, since both Unilever™ and General Mills™ manufacture ice cream (i.e., a common product type).

Further, by way of example, the user may have purchased a personal grooming product, such as Axe™ body spray manufactured by Unilever™. In such an instance, transaction server 142 may determine that another business entity, such as Proctor & Gamble™ manufactures also personal grooming products, such as Olay™ moisturizers and Gillette™ razors. Transaction server 142 may execute software instructions that, based on this information, determine that the commons stock of Unilever™ and Proctor & Gamble™ could be of potential interest to the user, as both Unilever™ and Proctor & Gamble™ provide personal grooming products.

Further, the disclosed embodiments are not limited to processes that identify securities based on transaction data. For example, in step 314, transaction server 144 may access profile data associated with the user (e.g., within customer data 144A of FIG. 1), which may identify one or more securities of potential interest to the user. Alternatively, transaction server 142 may identify one or more of the first securities based on a history of prior financial services transaction (e.g., sales or purchases of securities associated with particular product sectors), based on one or more securities currently held by the user (e.g., as stored within portfolio data 144C of FIG. 1), based on relationships between securities (e.g., a mutual find that includes a common stock), based on relationship between issues of securities within a manufacturing supply chains, or through any additional or alternate technique appropriate to the user and transaction server 142.

For example, as described herein, transaction server 142 may identify Unilever™ common stock as one of the first securities based on the user's purchase of Ben & Jerry's™ ice cream in step 314. In some embodiments, transaction server 142 may also identify, as securities of potential interest in step 314, two mutual funds that include shares of stock issued by Swift™ Transportation, which transports Ben & Jerry's™ ice cream from manufacturing plants to various retail outlets.

Referring back to FIG. 3, transaction server 142 may execute software instructions that determine, generate, and/or identify an investment risk tolerance associated with the user in step 316. The disclosed embodiments may be configured to determine and store an investment risk tolerance in different formats. For instance, transaction server 142 may be configured to generate the risk tolerance for the user in the form of a numerical score value or other type of format. In one example, a risk tolerance score value may range from one to ten, with a risk tolerance of one indicating the user's aversion to risk within an investment portfolio, and a risk tolerance of ten indicating the user's acceptance of substantial risk in the investment portfolio. The disclosed embodiments may also execute software processes to generate an investment risk tolerance in other formats, such as graphical representations (e.g., sliding scale, color codes, or other formats).

In one embodiment, transaction server 142 may be configured to execute software processes that enable a user to specify the investment risk tolerance score, e.g., at an initial registration to access investment products associated with the financial institution. The specification of the investment risk tolerance score may, however, be appropriate for only experienced investors that have a clear idea of the level of risk with which they may comfortably purchase securities, and further, the extent to which financial risk can be tolerated before liquidating their position in the securities.

In contrast, inexperienced investors may have little or no idea how to gauge their individual risk tolerance. Moreover, while a lengthy and detailed questionnaire may assist an inexperienced user in gauging a personal risk tolerance, the length and breadth of such questionnaires may be daunting to a new investor and may represent a barrier that prevents the new investor from exploring investment opportunities available at the financial institution. Thus, in some embodiments, transaction server 142 may execute software processes that present the user with an interface that enables the user to provide feedback, such as an interactive game process that poses one or more questions indicative of the user's risk tolerance in an entertaining fashion.

In an embodiment, the interactive game may enable the user to select an avatar that graphically represents the user, the user's alter ego, or a character within the game. Avatars consistent with the disclosed embodiments may include three-dimensional forms (e.g., as in games or virtual worlds) and two-dimensional forms (e.g., an icon in Internet forums and other online communities). By way of example, transaction server 142 may enable the user to select an avatar that includes a three-dimensional animated character that asks questions and interacts with the client in an entertaining way.

The avatar may pose entertaining questions to the user to elicit responses indicative of the user's investment risk tolerance. For example, the questions may include, but are not limited to, queries about the user's preferred activities, preferred products, and situational or anecdotal choices. The user may provide appropriate responses to the questions posed by the avatar, which include, but are not limited to, a voice input, a textual input, and a gestural input on a surface of a touchscreen, and transaction server. In such instances, transaction server 142 may process the received responses to determine the investment risk tolerance score of the user.

Referring back to FIG. 3, in step 316, transaction server 142 may adaptively modify the investment risk tolerance score in accordance with one or more securities currently held by the customer, or alternatively, in response to a history of the user's purchases and sales of securities over a predetermined time period (e.g., one month, six month, or one year). For example, transaction server 142 may be configured to obtain information in step 316 that identifies the user as being very risk averse, e.g., an investment risk tolerance score of unity. As described herein, the investment risk tolerance score may be specified by the user, or alternatively, determined by transaction server 142 as a result of an interactive, avatar-based game. Transaction server 142 may, however, determine that the user regularly engaged in the day trading of highly speculative securities, such as futures contracts, stock options, and currencies, over a six-month period.

In some embodiments, transaction server 142 may transmit an alert to client device 102 that identifies the inconsistency between that user's history of financial services transactions and the investment risk tolerance score, and further, that invites the user to modify the investment risk tolerance score to indicate a greater or lesser acceptance of risk. Additionally or alternatively, transaction server 142 may automatically adapt, without user input, the investment risk tolerance score to be consistent with the user's purchases and sales of securities over a predetermined period (e.g., six months).

Referring back to FIG. 3, upon identification of the user's investment risk tolerance, transaction server 142 may process the identified securities in step 318 to select a subset of the securities that are related to the products purchased by the user and further, that are consistent with the user's investment risk tolerance score. For example, transaction server 142 may determine that common stock issued by Unilever™, common stock issued by General Mills™, and corporate bonds issued by Unilever™ could be of potential interest to the user based on the user's recent purchase of Ben & Jerry's™ premium ice cream, and further, that the user is generally risk averse (e.g., associated with an investment risk tolerance score of 3). In such an embodiment, transaction server 142 may select the common stock issued by Unilever™ and General Mills™ as "suggested" securities, as these securities are of potential interest to the user based on the users transaction data and are associated with a level of risk consistent with the user's investment risk tolerance score.

In step 320, transaction server 142 may determine whether the user is associated with an existing investment portfolio. For example, transaction server 142 may access portfolio data associated with one or more user of the financial institution (e.g., portfolio data 144C of FIG. 1) to determine whether the user is associated with a "actual" investment portfolio including actual positions in one or more securities, and additionally or alternatively, a "virtual" investment portfolio including simulated positions in one or more securities.

If transaction server 142 determines that the user is associated with an actual or virtual investment portfolio (step 320; Yes), transaction server 142 may obtain portfolio data corresponding to the user's actual investment portfolio, and additionally or alternatively, the user's virtual investment portfolio, in step 322. For example, transaction server 142 may access a data repository associated with the financial institution (e.g., portfolio data 144C of FIG. 1) to obtain the portfolio data for the customer's actual and/or virtual investment portfolios.

In step 324, transaction server 142 may determine a strategy for rebalancing the customer's actual investment portfolio and/or the customer's virtual investment portfolio based on, for example, the obtained portfolio data and the suggested securities. In an embodiment, the user's actual investment portfolio (and additionally or alternatively, the user's virtual investment portfolio) may be generated on the basis of a target asset allocation defined by, for example, the customer's investment risk tolerance more and one or more investment goals of the customer. In some embodiments, the rebalancing strategy determined by transaction server 142 may increase a position in one or more under-represented securities (e.g., virtually or through a purchase of the under-represented securities) and may decrease a position in one or more over-represented securities (e.g., virtually or through a sale of the over-represented securities) in order to bring the user's investment portfolio back into line with the target asset allocation.

By way of example, transaction server 142 may identify suggested securities that include stock issued by Unilever™ and General Mills™, and further, may determine that the user is generally risk averse (e.g., associated with an investment risk tolerance score of 3). Further, based on the obtained portfolio data, transaction server 142 may determine that the user's actual investment portfolio includes no Unilever™ stock and 150 shares of General Mills™ stock.

In such an embodiment, transaction server 142 may execute a rebalancing process that executes a rebalancing strategy equalizing the user's position in both Unilever™ and General Mills™ stock within the actual investment portfolio (e.g., in step 324). For example, transaction server 142 may identify; (i) a first balancing strategy that leverages available cash to purchase 150 shares of Unilever™ on a corresponding market; (ii) a second balancing strategy that includes selling 75 shares of General Mills™ common stock to finance a purchase of 75 shares of Unilever™ stock; and/or (iii) a third balancing strategy that includes selling other securities in the actual investment portfolio to finance the purchase of 150 shares of Unilever™ stock.

In some embodiments, transaction server 142 may generate the rebalancing strategy in step 324 based on the user's investment risk tolerance score, and further, based on one or more investment goals specified by the user and stored in a corresponding data repository, e.g., within customer data 144A of FIG. 1. For example, such investment goals include, but are not limited to, a specified cash reserve associated with the actual or virtual investment portfolio, a maximum value of all securities and cash within the actual or virtual investment portfolio, and a ratio of debt instruments (e.g., bonds) to equity instruments (e.g., common stock) within the actual or virtual investment portfolio.

Additionally or alternatively, an investment advisor associated with the financial institution may interact with transaction server 142, and further, with the user at client device 102, to develop the rebalancing strategy based on the user's investment risk tolerance score, the investment goals, and further, other intangible information identified by the financial advisor during face-to-face, voice, or electronic communications with the user. For example, such intangible information may include, but is not limited to, an ability of the user to rapidly liquidate one or more potions of the actual or virtual investment portfolio and a need to liquidate the portfolio within a predetermined time period (e.g., a need to finance a child's education).

Referring back to FIG. 3, in step 326, transaction server 142 may generate a message that alerts the user to the rebalancing of the actual investment portfolio, identifies the rebalancing strategy or strategies, and request the user's input on and approval of the rebalancing. For example, the generated rebalancing message may enable the user to select one of the rebalancing strategies for execution, request that no rebalancing occur, and additionally or alternatively, to provide information identifying an alternate rebalancing strategy. Transaction server 142 may transmit the rebalancing message across network 120 to client device 102 using, for instance, any of the communications protocols outlined above, Upon receipt of the rebalancing message, client device 102 may execute software processes that render and display the received message within a corresponding interface. The user may select a desired rebalancing strategy, and client device 102 may incorporate the user's selection into a corresponding response, client device 102 may be transmitted across network 120 to transaction server 142 using any of the communications protocols outlined above.

Referring back to FIG. 3, transaction server 142 may receive the response in step 328, and rebalance the user's actual (or virtual) investment portfolio in step 330 based on the received response. For example, the received response may indicate the user's selection of the second rebalancing strategy, i.e., the sale of 75 shares of General Mills™ stock to finance a purchase of 75 shares of Unilever™ stock. In such an instance, transaction server 142 may rebalance the actual investment portfolio in step 328 by executing one or more financial services transactions to sell the 75 shares of General Mills™ stock and to purchase the 75 shares of Unilever™ stock.

Transaction server 142 may generate a confirmation of the rebalanced portfolio in step 332, which may be transmitted to client device 102 over network 120. In certain aspects, transaction server 142 may provide the confirmation using any of the communications protocols described herein. For example, the confirmation may identify one or more financial services transactions executed to rebalance the portfolio (e.g., the sale of 75 shares of General Mills™ stock and the purchase of 75 shares of Unilever™ stock), a current composition of the actual investment portfolio, and one or more characteristics of the actual investment portfolio (e.g., a total value and a debt-to-equity ratio).

Transaction server 142 determines in step 334 whether a "watch list" should be generated for the user, or alternatively, whether an existing watch list should be updated, based the suggested securities (e.g., as identified in step 318). As described above, a "watch list" may include one more securities, corporations, or other entities of interest to the user, and transaction server 142 may provide updates (e.g., real-time or at periodic intervals) on a performance of the securities, companies, and entities. Further, in an embodiment, the customer's watch list may be created independently of and subsequent to the creation of an actual or virtual investment portfolio of the customer, and further, the watch list may include additional securities of interest not included within either of the customer's virtual or actual investment portfolios.

For example, in step 334, transaction server 142 may determine whether information identifying Unilever™ and General Mills™ stock, and additionally or alternatively, information identifying Unilever™ and General Mills™, should be included within an existing watch list or should form the basis of a new watch list. Further, in additional embodiments, transaction server 142 may determine in step 334 whether any other securities or issuers should be added to the watch list based on, e.g., purchases of securities or additional transactions occurring within a predetermined prior time period (e.g., thirty days).

If transaction server 142 determines that the watch list should be generated or updated based on the suggested securities (step 334; Yes), transaction server 142 may update to the watch list or create the watch list in step 336. For example, in step 336, transaction server 142 may add information identifying the stocks of the Unilever™ and the General Mills™ to the watch list. Transaction server 142 may generate and transmit various updates regarding the securities on the watch list, including, but not limited to, the common stock of the Unilever™ and General Mills™, to client device 102 at various intervals (e.g., at period intervals, at specified intervals (such as daily or weekly), or in response to certain market events (such as a decline in an index of a specified amount), as described above. Exemplary method 300 is then complete in step 310.

If, however, transaction server 142 determines that no update to or creation of the watch list is necessary (step 334; No), transaction server 142 may execute software processes to pass method 300 back to step 310. For example, in step 334, transaction server 142 may access an existing watch list associated with the user (e.g., stored within portfolio data 144C of FIG. 1), and may determine that the watch list already includes information identifying the common stock of Unilever™ and General Mills™, and additionally or alternatively, information identifying Unilever™ and General Mills™.

If, however, transaction server 142 determines that the user is not associated with an actual or virtual investment portfolio (step 320; No), transaction server 142 may determine a strategy for creating an actual investment portfolio, a virtual investment portfolio, or any combination of actual and virtual investment portfolios based on the suggested securities in step 338.

As described above, transaction server 142 may determine that common Unilever™ stock and General Mills™ stock are consistent with the customer's investment risk tolerance and might be of potential interest to the customer. In certain aspects, transaction server 142 may determine a strategy in step 338 for generating an actual investment portfolio that includes the common stock of Unilever™ and the common stock of General Mills™. For example, and as described herein, the portfolio generation strategy may be based on one or more investment goals, which include, but are not limited to, a specified cash reserve associated with the actual or virtual investment portfolio, a maximum value of all securities and cash within the actual or virtual investment portfolio, and a ratio of debt instruments (e.g., bonds) to equity instruments (e.g., common stock) within the actual or virtual investment portfolio.

Additionally or alternatively, an investment advisor associated with the financial institution may interact with transaction server 142, and further, with the user at client device 102, to develop the portfolio generation strategy based on the customer's investment risk tolerance score, the investment goals, and further, other intangible information identified by the financial advisor during face-to-face, voice, or electronic communications with the customer, as described herein.

For example, transaction server 142 may determine a portfolio generation strategy in step 338 that equalizes the customer's position in both Unilever™ and General Mills™ stock, or alternatively, emphasizes a position in either one of the Unilever™ or General Mills™ stock (e.g., since one of the corporations is expected to provide a divided over a predetermined time period). In such an embodiment, transaction server 142 may identify: (i) a first portfolio generation strategy that includes purchasing 75 shares of Unilever™ stock and 75 shares of General Mills™ stock; (ii) a second portfolio generation strategy that includes purchasing 100 shares of Unilever™ stock and 50 shares of General Mills™ stock; and (iii) a third portfolio generation strategy that includes purchasing 50 shares of Unilever™ stock and 100 shares of General Mills™ stock.

Referring back to FIG. 3, in step 340, transaction server 142 may generate a message that alerts the user to the creation of the actual investment portfolio, identifies the portfolio creation strategy or strategies, and request the user's input on and approval of the creation of the user's actual investment portfolio. For example, the generated message may request that the user select one of the portfolio generation strategies for execution, or alternatively, provide input cancelling the portfolio generation or identifying an alternate strategy for generating the actual investment portfolio. Transaction server 142 may, in one example, transmit the message in step 340 across network 120 to client device 102, such as through any of the communications protocols described herein.

Upon receipt of the message, client device 102 may execute software processes to render the received message for display on an interface of a display of client device 102. Client device 102 may execute software processes that enable the user to select a desired portfolio generation strategy through the interface (and other input mechanisms). In one aspect, client device 102 may incorporate the user's selection into a corresponding response, which may be transmitted across network 120 to transaction server 142 using any of the communications protocols described herein.

Referring back to FIG. 3, transaction server 142 may receive the response in step 342, and may generate the user's actual investment portfolio in step 344 based on the received response. For example, the received response may indicate the user's selection of the second portfolio generation strategy, e.g., the purchase of 50 shares of General Mills™ stock and 100 shares of Unilever™ stock. In such an embodiment, transaction server 142 may generate the actual investment portfolio in step 344 by executing one or more financial services transactions to purchase the 50 shares of General Mills™ stock and the 100 shares of Unilever™ stock.

Transaction server 142 may generate a confirmation of the created portfolio, which may be transmitted in step 346 to client device 102 over network 120 using any of the communications protocols outlined above. For example, the confirmation may identify one or more financial services transactions executed to create the portfolio (e.g., the purchase of 50 shares of General Mills™ stock and 100 shares of Unilever™ stock), a current composition of the actual investment portfolio, and one or more characteristics of the actual investment portfolio (e.g., a total value and a debt-to-equity ratio). Upon transmission of the confirmation message in step 346, exemplary method 300 passes back to step 334, and transaction server 142 determines whether a "watch list" should be generated for the user, or alternatively, whether an existing watch list should be updated, as described herein.

In some exemplary embodiments, transaction server 142 may rebalance an existing actual investment portfolio, and additional or alternatively, may create an new actual investment portfolio, based on a user's response to an alert identifying one or more proposed rebalancing or creation strategies. The disclosed embodiments are not limited to rebalancing and creation operations performed in response to specific user input, and in additional embodiments, transaction server 142 may automatically rebalance an existing actual investment portfolio or create a new actual investment portfolio without explicit user authorization.

For example, the user may be an experienced investor, and may specify within corresponding prone data (e.g., as stored within customer data 144A of FIG. 1) that transaction server 142 may automatically rebalance or create an actual investment portfolio without approval if the rebalanced or generated investment portfolio conforms to specific investment goals. Such investment goals include, but are not limited to, a specified cash reserve associated with the actual investment portfolio, a maximum value of all securities and cash within the actual investment portfolio, and a ratio of debt instruments to equity instruments within the actual (or virtual) investment portfolio. Further, in an embodiment, the user may specify one or more authorized financial services transactions (e.g., a sale or purchase or a particular security)

that may be executed by transaction server 142 as part of a portfolio creation or rebalancing strategy without prior explicit approval.

Further, in the embodiments described above, transaction server rebalances an actual investment portfolio of the user, or alternatively, generates an actual investment portfolio for the user. The disclosed embodiments are, however, not limited to actual investment portfolios, and in additional embodiments, the exemplary techniques described above in reference to FIG. 3 can be applied to rebalance an existing "virtual" portfolio of a user based on, for example, transaction data of the user, the user's investment risk tolerance, and one or more investment goals of the user. For example, transaction server 142 may identify one or more rebalancing strategies for the virtual investment portfolio, and in response to an authorization of the user, generate "simulated" positions in the suggested securities in accordance with the user's selected rebalancing strategy.

Similarly, the exemplary techniques of FIG. 3 may be applied to generate a new virtual investment portfolio for the user based on, for example, transaction data of the user, the user's investment risk tolerance, and one or more investment goals of the user. In such embodiments, transaction server 142 may identify one or more generation strategies for the virtual investment portfolio based on suggest securities of potential interest to the user, receive a selection of one of the portfolio generation strategies from the user, and generate "simulated" positions in the suggested securities in accordance with the user's selection.

Further, the disclosed embodiments are not limited to rebalancing and generating either an actual investment portfolio or a virtual investment portfolio. In additional embodiments, the user may be associated with one or more actual investment portfolios and one or more virtual investment portfolios (which may securities with the actual investment portfolios), and the exemplary techniques of FIG. 3 may enable transaction server 142 to rebalance each of the existing actual and virtual investment portfolios concurrently or sequentially, and further, to generate any number of additional actual or virtual investment portfolios appropriate to the user.

In certain embodiments, the virtual investment portfolios rebalanced or created by transaction server 142 may correspond to one or more attributes of an actual investment portfolio, had it been purchased by the user. By monitoring a virtual portfolio, or alternatively, by creating a "watch list" of various investments, the user may see what financial gains or losses would have been made, had user client actually purchased the stocks in the virtual investment portfolio and/or the watch list. Further, virtual investment portfolios consistent with the disclosed embodiments may include investments held by the user (e.g., in an actual investment portfolio) and others not held by the user. Additionally, securities in the user's watch list may be monitored over time to review performance with respect to the user's actual or virtual investment objectives.

Additionally, the embodiments described above facilitate the rebalancing and creation of one or more actual and virtual investment portfolios based on transaction data associated with a user. In additional embodiments, a decision to rebalance or to create an actual or virtual investment portfolio for the user may be based on group of additional users (e.g., an "investment group") identified by the user or determined by transaction server 142. In an embodiment, the identified investment group may include, but is not limited to, the user's spouse or partner, a parent of the user, a grandparent of the user, a child of the user, and any additional or alternate family member identified by the user or by transaction server 142.

In additional embodiments, the investment group may be demographically similar to the user. For example, transaction server 142 may identify members of the investment based on profile data for the user (e.g., customer data 144A of FIG. 1), and may include, but is not limited to, information identifying one or more individuals listed within an email or telephone contact list of the customer, information identifying friends of the user within corresponding social networking applications (e.g., Facebook™ and LinkedIn™), and information identifying one or more followers of the user within a micro-blogging application (e.g., Twitter™).

In additional embodiments, transaction server 142 may identify members of the investment group based on, for example, demographic characteristics of the user (e.g., age, income, and education level), the user's location, and one or more user preferences specified within the user profile data (e.g., customer data 144A of FIG. 1). Additionally or alternatively, members of the investment group may share an investment risk tolerance similar to that of the customer, or alternatively, may share one or more transaction characteristics with the user (e.g., purchases from common retailer, purchases of common goods or services) or may be associated with a similar history of financial services transactions (e.g., that day trade in speculative securities). In such embodiments, transaction server 142 may access profile data for the user, may select one or more additional users associated with the financial institution for inclusion in the investment group, and may identify transaction data associated with not only the user in step 312, but also with members of the investment group.

As described above, transaction server 142 may leverage the transaction data obtained for the group to identify one or more suggested securities of potential interest to the user. Further, the investment risk tolerance for the user may also be determined in the basis of the risk tolerances for the group. Further, in both a virtual or actual investment portfolio, group information may be used by transaction server 142 to determine buy and/or sell decisions or recommendations. For example, if it has been observed that the user's peer group tends to refuel at Exxon™ and not Shell™, a recommendation could be made to purchase shares of Exxon™, and continue to watch the performance of shares of Shell™.

In the embodiments described above, transaction server 142 obtains transaction data for a user, or alternatively, for a group associated with the user. In such embodiments, the obtained transaction data may include a hierarchy of information identify a corresponding good or service. For example, the obtained transaction data may include SKU level data that uniquely identify the good or service. If, however, the SKU level data is not available for a particular transaction, the obtained transaction data may include merchant level data (e.g., data identifying the merchant and types of merchandise sold by the merchant).

Further, in an embodiment, the goods or services identified within the obtained transaction data may not be associated with a publicly traded security. For example, if SKU level information is provided that identifies a particular good or service manufactured by a privately held company, transaction server 142 may be unable to identify a corresponding security. In such an embodiment, transaction server 142 may identify a market sector associated with the particular good or service, and identify a corresponding security associated with the market sector (e.g., a sector-based mutual fund or exchange-traded fund (ETF)).

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A computer-implemented method, comprising:
    receiving, by one or more processors, a first signal from a device connected to a system across a communications network, the first signal being generated by an application program executed by the device, and the device being associated with a first user;
    detecting, by the one or more processors, a network address associated with the received first signal;
    determining, by the one or more processors, that the detected network address corresponds to a network address of a registered device associated with the first user;
    authenticating, by the one or more processors, an identity of the first user based on the determination that the detected network address corresponds to the network address of the registered device;
    in response to the authenticated identity, retrieving, by the one or more processors, first transaction data associated with the detected network address from a storage unit of the system, the first transaction data identifying first products purchased from corresponding retailers;
    obtaining, by the one or more processors, second transaction data identifying second products purchased by a second user associated with the first user;
    identifying, by the one or more processors, a first security based on the first transaction data and the second transaction data, the first security having an issuer, and the issuer being a manufacturer or a distributor of the first or second products; and
    generating and transmitting, by the one or more processors, a second signal comprising information that identifies the first security to the detected network address of the device, the information causing the application program executed by the device to generate and present a graphical representation of the first security through an interface.

2. The method of claim 1, further comprising:
    obtaining information indicative of an investment risk tolerance of the first user;
    identifying the first security based on the first transaction data, the second transaction data, and the investment risk tolerance information; and
    purchasing a unit of the first security to create or modify an investment portfolio.

3. The method of claim 2, wherein:
    the first transaction data identifies a prior financial services transaction; and
    the method further comprises:
        determining a modified investment risk tolerance in accordance with the prior financial services transaction; and
        identifying the first security based on the first transaction data, the second transaction data, and the modified investment risk tolerance.

4. The method of claim 1, further comprising:
    determining whether an investment portfolio conforms to an investment goal, the investment goal comprising at least one of a cash reserve, a ratio of debt securities to equity securities, or a limit on a value of the investment portfolio; and
    generating and transmitting a third signal to an additional computing system, the third signal comprising information that causes the additional computing system to perform operations initiating a sale of a unit of the first security when the investment portfolio fails to conform with the investment goal.

5. The method of claim 1, further comprising generating a virtual investment portfolio comprising a first simulated financial position in the first security.

6. The method of claim 1, wherein the identifying comprises:
    identifying a plurality of candidate securities;
    determining that an issuer of a first one of the candidate securities manufactures or distributes the first or second products; and
    selecting the first one of the candidate securities as the first security in response to determination.

7. The method of claim 1, further comprising:
    obtaining profile data associated with the first user;
    determining an existence of a familial relationship between the first and second users based on the obtained profile data; and
    obtaining the second transaction data in response to the determined existence of the familial relationship.

8. A system, comprising:
    a communications unit;
    a storage device; and
    at least one processor coupled to the storage device and to the communications unit, the storage device storing software instructions for controlling the at least one processor when executed by the at least one processor, and the at least one processor is operative with the software instructions and is configured to:
        receive a first signal from a device via the communications unit, the first signal being generated by an application program executed by the device, and the device being connected to the system across a communications network and associated with a first user;
        detect a network address associated with the received first signal;
        determine that the detected network address corresponds to a network address of a registered device associated with the first user;
        authenticate an identity of the first user based on the determination that the detected network address corresponds to the network address of the registered device;
        in response to the authenticated identity, retrieve, from the storage unit, first transaction data associated with the detected network address, the first transaction data identifying first products purchased from corresponding retailers;
        obtain second transaction data identifying second products purchased by a second user associated with the first user;
        identify a first security based on the first transaction data and the second transaction data, the first security having an issuer, and the issuer being a manufacturer or a distributor of the first or second products; and generate and transmit, via the communications unit, a second signal comprising information that identifies the first security to the detected network address of the device, the information causing the application program executed by the device to generate and present a graphical representation of the first security through an interface.

9. The system of claim 8, wherein the at least one processor is further configured to:
   obtain information indicative of an investment risk tolerance of the first user; and
   identify the first security based on the first transaction data, the second transaction data, and the investment risk tolerance information.

10. The system of claim 8, wherein the first transaction data identifies a prior financial services transaction, and wherein the at least one processor is further configured to:
    determine a modified investment risk tolerance in accordance with the prior financial services transaction; and
    identify the first security based on the first transaction data, the second transaction data and the modified investment risk tolerance.

11. The system of claim 8, wherein the at least one processor is further configured to:
    determine whether an investment portfolio conforms with an investment goal, the investment goal comprising at a cash reserve, a ratio of debt securities to equity securities, or a limit on a value of the investment portfolio; and
    generate and transmit, via the communications unit, a third signal to an additional computing system, the third signal comprising information that causes the additional computing system to perform operations initiating a sale of a unit of the first security when the investment portfolio fails to conform with the investment goal.

12. The system of claim 8, wherein the at least one processor is further configured to generate a virtual investment portfolio comprising a first simulated financial position in the first security.

13. The system of claim 8, wherein the at least one processor is further configured to:
    identify a plurality of candidate securities;
    determine that an issuer of a first one of the candidate securities manufactures or distributes the first or second products; and
    select the first one of the candidate securities as the first security in response to the determination.

14. The system of claim 8, wherein the at least one processor is further configured to:
    obtain profile data associated with the first user;
    determine an existence of a familial relationship between the first and second users based on the obtained profile data; and
    obtain the second transaction data in response to the determined existence of the familial relationship.

15. A tangible, non-transitory computer-readable medium storing instructions that, when executed by at least one processor, cause the at least one processor to perform a method, comprising:
    receiving a first signal from a device connected to a system across a communications network, the first signal being generated by an application program executed by the device, and the device being associated with a first user;
    detecting a network address associated with the received first signal;
    determining that the detected network address corresponds to a network address of a registered device associated with the first user;
    authenticating an identity of the first user based on the determination that the detected network address corresponds to the network address of the registered device;
    in response to the authenticated identity, retrieving, from a storage unit of the system, first transaction data associated with the detected network address, the first transaction data identifying first products purchased from corresponding retailers;
    obtaining second transaction data identifying second products purchased by a second user associated with the first user;
    identifying a first security based on the first transaction data and the second transaction data, the first security having an issuer, and the issuer being a manufacturer or a distributor of the first or second products; and
    generating and transmitting a second signal comprising information that identifies the first security to the detected network address of the device, the information causing the application program executed by the device to generate and present a graphical representation of thefirst security through an interface.

16. The method of claim 1, further comprising:
    obtaining demographic data identifying a demographic characteristic exhibited by the first user, the demographic characteristic comprising an age, an income, an education level, or a geographic location;
    determining that the second user exhibits the demographic characteristic exhibited by the first user; and
    obtaining the second transaction data in response to the determination.

17. The system of claim 8, wherein:
    the first signal comprises a request to obtain the information identifying the first security, the request being generated by the application program executed by the device; and
    the at least one processor is further configured to:
    retrieve, from the storage unit, device data identifying network addresses of a plurality of registered devices, the device data associating the network address of each of the registered devices with a corresponding user of the system; and
    based on the device data, determine that the detected network address corresponds to the network address of the registered device associated with the first user.

18. The system of claim 8, wherein the detected network address comprises an Internet Protocol address of the device.

19. The system of claim 8, wherein the at least one processor is further configured to:
    obtain demographic data identifying a demographic characteristic exhibited by the first user, the demographic characteristic comprising an age, an income, an education level, or a geographic location;
    determine that the second user exhibits the demographic characteristic exhibited by the first user; and
    obtain the second transaction data in response to the determination.

20. The system of claim 8, wherein upon receipt of the second signal, the information causes the application program executed by the device to generate and present the graphical representation of the first security through the interface without input from the first user.

* * * * *